(12) United States Patent
Sekine et al.

(10) Patent No.: US 6,589,899 B2
(45) Date of Patent: Jul. 8, 2003

(54) SPINEL TYPE SIALON, SPINEL TYPE SILICON OXYNITRIDE AND METHODS FOR PRODUCING THEIR POWDERS

(75) Inventors: Toshimori Sekine, Ibaraki (JP); Hongliang He, Ibaraki (JP); Takamichi Kobayashi, Ibaraki (JP); Koji Kimoto, Ibaraki (JP); Mamoru Mitomo, Ibaraki (JP)

(73) Assignee: National Institute for Research in Inorganic Materials, Tsukuba (JP)

( * ) Notice: Subject to any disclaimer, the term of this patent is extended or adjusted under 35 U.S.C. 154(b) by 86 days.

(21) Appl. No.: 09/803,092

(22) Filed: Mar. 12, 2001

(65) Prior Publication Data

US 2002/0045529 A1 Apr. 18, 2002

(30) Foreign Application Priority Data

Oct. 12, 2000 (JP) ........................................ 2000-312642
Dec. 12, 2000 (JP) ........................................ 2000-377010

(51) Int. Cl.$^7$ .............................................. C04B 35/599
(52) U.S. Cl. .................................... 501/98.1; 423/327.1
(58) Field of Search .............................. 501/98.1, 98.2; 423/327.1

(56) References Cited

FOREIGN PATENT DOCUMENTS

| JP | 2001-199714 | * | 7/2001 |
| JP | 2002-179412 | * | 6/2002 |
| WO | 02/18299 | * | 3/2002 |

* cited by examiner

*Primary Examiner*—Karl Group
(74) *Attorney, Agent, or Firm*—Oblon, Spivak, McClelland, Maier & Neustadt, P.C.

(57) ABSTRACT

A high pressure phase spinel type sialon represented by the chemical formula $Si_{6-x}Al_xO_xN_{8-x}$ ($0<x\leq4.2$), and a high pressure phase spinel type silicon oxynitride represented by the chemical formula $Si_{3+x}O_{2x}N_4$ ($=Si_3N_4 \cdot xSiO_2$, $0<x<1$). Methods for their production by instantaneous pressing by means of an impulse wave.

15 Claims, 2 Drawing Sheets

SPINEL TYPE SIALON, SPINEL TYPE SILICON OXYNITRIDE AND METHODS FOR PRODUCING THEIR POWDERS

BACKGROUND OF THE INVENTION

1. Field of the Invention

The present invention relates to a novel high pressure phase spinel type sialon and a method for producing its powder. The present invention also relates to a novel high pressure phase spinel-type silicon oxynitride and a method for producing its powder, particularly a method for producing a spinel type silicon oxynitride by a so-called high pressure synthesis to convert a low pressure silicon oxynitride to a cubic spinel type silicon oxynitride by means of conventional various compression methods.

2. Discussion of Background

Heretofore, a synthesis of a spinel-type silicon nitride $Si_6N_8$ of the chemical formula $Si_{6-x}Al_xO_xN_{8-x}$ where x=0, has been known. However, the presence or synthesis of a high pressure phase spinel type sialon has not been known. Likewise, the presence or synthesis of a spinel type silicon oxynitride has not heretofore been known.

A method of synthesizing a spinel type silicon nitride by reacting Si and $N_2$ fluid in a diamond anvil cell, or by heating a low pressure phase silicon nitride (such as $\alpha$-$Si_3N_4$, $\beta$-$Si_3N_4$ or amorphous $Si_3N_4$) under a pressure of 15 GPa at a temperature of at least 2,000 K, or by subjecting a low pressure phase silicon nitride to impulse treatment at a pressure of at least 20 GPa, is known.

It is an object of the present invention to provide a novel spinel type sialon by means of an impulse pressuring technique employing an impulse wave. If a spinel type sialon can be synthesized in a large amount, its physical properties, etc. can be investigated, and it will be possible to develop new substances, particularly new materials having e.g. an oxide such as $Al_2O_3$ or a nitride such as AlN solid-solubilized in the spinel type silicon nitride.

It is another object of the present invention to provide a novel substance of a spinel silicon nitride type by means of a conventional impulse treating technique by means of an impulse wave.

The present inventors have conducted an extensive study to accomplish the above objects. As a result, it has been found that if a proper amount of copper powder is mixed with a low pressure phase sialon powder, the mixture is press-molded to a proper density, and the molded product is subjected to impulse compression at a proper temperature and pressure for a short time of at least a certain degree, it is possible to convert it to a high pressure phase spinel type sialon powder by a single impulse treatment without changing the composition of the starting material sialon powder. Further, it has been found that if a proper amount of a copper powder is mixed to a low pressure phase silicon oxynitride powder, the mixture is press-molded to a proper density, and the molded product is subjected to impulse compression at a proper temperature and pressure for a short time of at least a certain degree, it is possible to convert it to a high pressure phase spinel type silicon oxynitride powder by solid-solubilizing an oxide $SiO_2$ in spinel silicon nitride, without changing the composition of the starting material silicon oxynitride powder.

Thus, the present invention provides a high pressure phase spinel type sialon represented by the chemical formula $Si_{6-x}Al_xO_xN_{8-x}$ (0<x≦4.2).

Further, the present invention provides a method for producing a spinel type sialon powder, which comprises instantaneously compressing a press-molded product made of a mixture comprising a copper powder and a powder of a low pressure phase β-sialon represented by the chemical formula $Si_{6-x}Al_xO_xN_{8-x}$ (0<x≦4.2), under a pressure of at least 15 GPa by an impulse wave for a pressing time of at most 5 microseconds, to let the low pressure phase β-sialon undergo phase transition to a high pressure phase spinel type sialon.

The high pressure phase spinel type sialon of the present invention is capable of taking in various cations by the spinel structure and is excellent in the thermal stability or the stability in an oxidizing atmosphere. Such stability is reflected to optical or electrical nature by an addition of a trace amount of other chemical components, and it is expected to be useful not only as a mechanical material but also as an optical material or an electronic material.

The present invention also provides a high pressure phase spinel type silicon oxynitride represented by the chemical formula $Si_{3+x}O_{2x}N_4$ (=$Si_3N_4 \cdot xSiO_2$, 0<x<1).

Still further, the present invention provides a method for producing a powder of a spinel type silicon oxynitride, which comprises compressing a low pressure crystal phase powder or amorphous silicon oxynitride (compositional formula $Si_{3+x}O_{2x}N_4$, 0<x<1) by an impulse wave to prepare a high pressure phase spinel type silicon oxynitride, wherein instantaneous pressing under a pressure of at least 20 GPa by an impulse wave for a pressing time of at most 5 microseconds, is applied to a press-molded product made of a mixture comprising a copper powder and a low pressure silicon oxynitride powder.

The high pressure phase spinel type silicon oxynitride of the present invention is highly dense and excellent in stability in an oxidizing atmosphere. Further, if oxygen enters the spinel structure, it takes a structure of lattice defect and shows a unique nature in its electrical characteristics, and thus, it is expected to be useful not only as a structural material but also as an electronic material.

DETAILED DESCRIPTION OF THE PREFERRED EMBODIMENTS

In the method for producing a high pressure phase spinel type sialon or a high pressure phase spinel type silicon oxynitride of the present invention, a conventional impulse pressuring method can be employed wherein a high temperature high pressure state generated by instantaneous impulse compression is utilized to carry out synthesis of a substance. In this impulse pressuring method, an apparatus is used which is designed to let a flyer to collide with the sample container at a high speed by means of a gunpowder and to exert a pressure to the starting material by the impact of the collision. Or, an impulse pressuring method employing an explosive may also be used.

Figure 1:
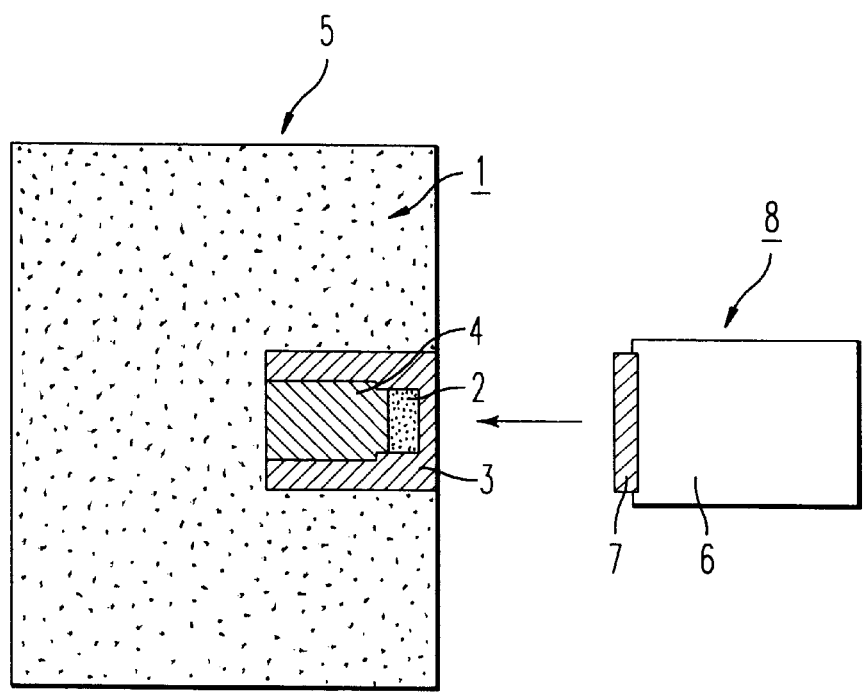
FIG. 1 is a schematic side view illustrating an apparatus to be used for carrying out the methods of the present invention.

FIG. 1 illustrates generation of the impulse wave to carry out the methods of the present invention and a sample for the impulse treatment. Specifically, the starting material (2) is put into a recovery container (3) made of copper to protect it from breakage by the impulse wave and held by a threaded cover (4) made of copper from behind of the starting material, and then the container (3) is embedded in a larger cylindrical container (1) made of iron to serve as a target. On the other hand, in order to generate the impulse wave by collision of a projectile (8) at a high speed, a propellant gun is used. To increase the impact pressure, the projectile is provided with a flyer plate (7) made of copper in front of a high density polyethylene servo (6).

In this impulse compressing method, the conditions for forming the press-molded product and the conditions for the impulse pressing are important. The conditions for forming a press-molded product include, for example, selection of the low pressure phase β-sialon powder or the low pressure phase silicon oxynitride powder as the starting material and the copper powder, the mixing condition, the apparent density of the press-molded product and the void distribution in the press-molded product.

Now, the method for producing a spinel type sialon powder will be described.

The low pressure phase β-sialon powder as the starting material is preferably a fine powder having good crystallinity, and the particle size is preferably at most 10 μm. Such a low pressure phase β-sialon powder can be prepared by reacting a powder mixture comprising $Si_3N_4$, $Al_2O_3$ and AlN in a predetermined ratio, at a temperature of from 1,700 to 1,800° C., or by a high temperature spontaneous reaction in a nitrogen gas atmosphere in accordance with the following reaction formula:

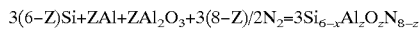

$$3(6-Z)Si+ZAl+ZAl_2O_3+3(8-Z)/2N_2=3Si_{6-x}Al_zO_zN_{8-z}$$

The low pressure phase β-sialon powder as the starting material, is mixed with a copper powder and formed into a press-molded product in order to make the impact conditions uniform and to increase the impact pressure. The copper powder is mixed in an amount of from about 99 to 80 wt %, to the low pressure phase β-sialon powder. As the copper powder, a commercial product having a particle size of at most 100 μm may be employed. The press molding is carried out by using a pressing rod as a piston of a hydraulic pump in the container for the starting material.

The apparent density of the press-molded product is important to control the impulse temperature, and it is properly be from 50% to 80% of the theoretical density, in order to sufficiently increase the reaction rate and to maintain the temperature at a level not to decompose or melt the low pressure phase β-sialon.

Besides, it is desired that the void distribution in the press-molded product is as uniform as possible. For this purpose, the particle size of the copper powder is preferably at most 50 μm, more preferably about 10 μm.

The recovery container (3) is most preferably made of a metal not reactive with β-sialon, and it must be capable of protecting the starting material from breakage by the impulse wave sufficiently, and usually a container made of copper is employed.

As a condition for the impulse pressing, the pressure is required to be at least 15 GPa. If the pressure exceeds 60 GPa, a gas will be generated by the decomposition reaction of partially melted material, whereby it tends to be difficult to recover the impulse-pressed molded product when the pressure is released. More preferably, the pressure is at most 50 GPa. The temperature is preferably at least 1,000° C. and at most 3,000° C.

Now, the method for producing a powder of a spinel type silicon oxynitride will be described.

The low pressure phase silicon oxynitride as the starting material is preferably one having the constituting elements uniformly distributed, and the particle size is preferably at most 10 μm. Such a low pressure phase silicon oxynitride powder can be prepared by a method for preparing amorphous silicon nitride $Si_3N_4$ or amorphous $Si_3N_4$—SC type material by incorporating oxygen as an impurity. Otherwise, fine powdery amorphous silicon nitride $Si_3N_4$ and fine powdery amorphous $SiO_2$ may be mixed and used. Or, a mixture of fine powdery crystalline silicon nitride $Si_3N_4$ (α-type or β-type) and fine powdery crystalline $Si_2ON_2$ or $SiO_2$, may be employed.

The low pressure phase silicon oxynitride as the starting material is mixed with a copper powder and formed into a press-molded product in order to make the impact conditions uniform or to increase the impact pressure. The copper powder is mixed in an amount of from 99 to 80 wt % to the powder of the low pressure phase silicon oxynitride. As the copper powder, a commercially available product having a particle size of at most 100 μm, may be used. The press-molded product may be prepared by pressing the starting material by e.g. a hydraulic press in a container.

The recovery container (3) is most preferably made of a metal which is not reactive with silicon oxynitride, and it must be capable of sufficiently protecting the sample from breakage by the impulse wave, and a container made of copper is usually employed. The apparent density of the press-molded product is important to control the impact temperature, and it is suitably be at a level of from 50% to 80% of the theoretical density, in order to sufficiently increase the reaction rate and to maintain the temperature at a level where silicon oxynitride will not decompose or melt. Yet, the void distribution in the press-molded product is preferably as uniform as possible. For this purpose, the particle size of the metal powder is preferably at most 50 μm, more preferably about 10 μm.

As a condition for the impulse environment, the pressure is required to be at least 20 GPa. If the pressure is increased beyond 100 GPa, the deformation of the container tends to be large, and at the same time, the sample is likely to decompose or partially melt, whereby it tends to be difficult to recover the sample when the pressure is released. The temperature is preferably from 1,000 to 3,000° C., more preferably about 2,000° C.

Now, the present invention will be described in further detail with reference to Examples. However, it should be understood that the present invention is by no means restricted to such specific Examples.

EXAMPLE 1

Using a mixture comprising 10 wt % of a β-sialon (chemical formula: $Si_{4.2}Al_{1.8}O_{1.8}N_{6.2}$) powder and 90 wt % of a copper powder, a press-molded product having an apparent density of 5.67 g/cm³ (voids: 25%) and having a diameter of 12 mm and a thickness of 2 mm, was prepared. The apparent density of the press-molded product of the mixture comprising β-sialon and a copper powder, was adjusted by controlling the molding pressure by a press. The press-molded product was accommodated in a cylindrical recovery container made of copper and having a wall thickness of 6 mm, and the press-molded product was held by a threaded cover made of copper from behind, and the recovery container was embedded in a larger cylindrical container made of iron to constitute a target.

As a projectile, a copper disk as a flyer plate was bonded to the main body made of high density polyethylene, and such a projectile was used for generating the necessary high pressure. A propellant gun was used to impinge the projectile on the target at a speed of 2 km/sec to carry out the impulse treatment under a pressure of about 50 GPa. The impact temperature was 1,700° C., as determined by a thermodynamic analysis. The impact pressure was obtained by measuring the speed of the projectile immediately prior to the collision, followed by calculation by the impedance matching method. The impact temperature was calculated on the assumption that the starting material will be thermally equilibrium with the temperature of the large amount of the copper powder.

After the impulse treatment, the press-molded product was taken out from the recovery container, and the press-molded product was immersed in a nitric acid solution for at least 5 hours to dissolve and remove the copper, and then the precipitate was washed with water and dried to obtain a powder.

Figure 2:
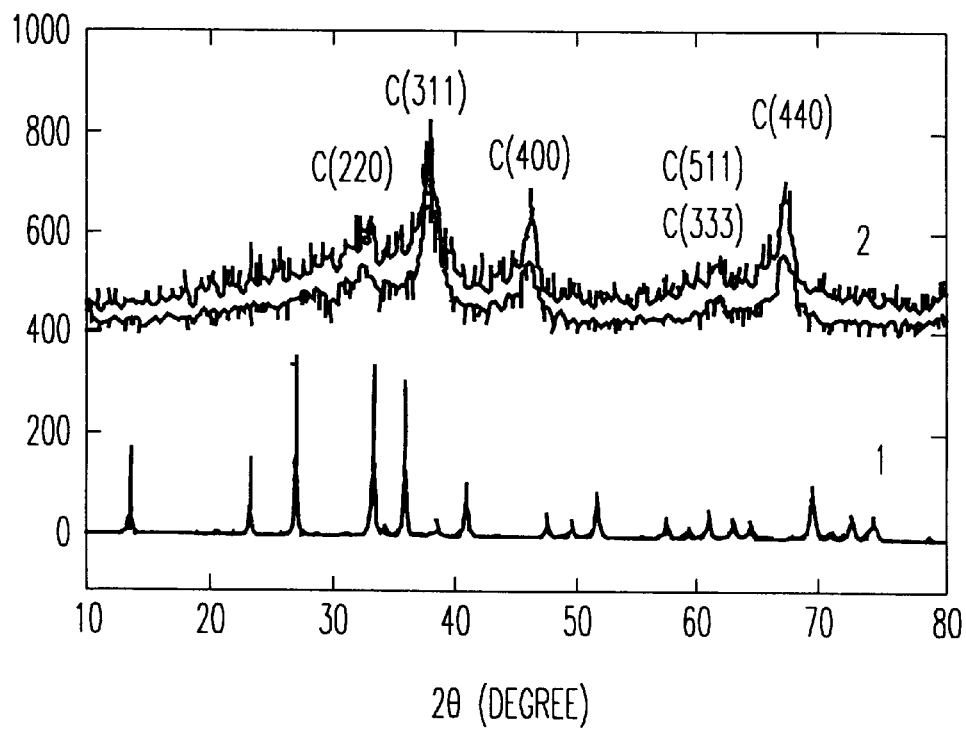
FIG. 2 is a graph showing the results of X-ray powder diffraction of the powder obtained in Example 1.

The obtained powder was identified by X-ray powder diffraction. From its diffraction spectrum as shown in FIG. 2, it was found to be substantially 100% cubic spinel type sialon. (1) is the X-ray diffraction spectrum of the starting material β-sialon (chemical formula: $Si_{4.2}Al_{1.8}O_{1.8}N_{6.2}$), and (2) is the spectrum of the cubic spinel type sialon obtained by the impulse treatment.

EXAMPLE 2

Using a mixture comprising 10% of a powder of amorphous silicon oxynitride (compositional formula: $Si_{3+x}O_{2x}N_4$, wherein x is 0.4) having a particle size of from 50 to 100 nm and 90 wt % of a copper powder, a press-molded product having an apparent density of 5.70 g/cm³ (voids: 30%) and having a diameter of 12 mm and a thickness of 2 mm, was prepared. The apparent density of the press-molded product of the mixture comprising the silicon oxynitride and the copper powder, was adjusted by controlling the molding pressure by a press. The press-molded product was accommodated in a cylindrical recovery container made of copper and having a wall thickness of 6 mm, and the press-molded product was held by a threaded cover made of copper from behind without clearance. Then, the recovery container was embedded at the center of a larger cylindrical container made of iron to constitute a target.

As a projectile, a copper disk as a flyer plate was bonded to the main body made of high density polyethylene, and the projectile was used for generation of the necessary impact pressure. A propellant gun was used to accelerate the speed of the projectile to 2 km/sec and impinge it against the target to carry out impulse treatment under a pressure of 51 GPa. The impact temperature was calculated by a thermodynamic analysis and was about 2,000° C. The impact pressure was calculated by the impedance matching method from the measurement of the speed of the projectile.

After the impulse treatment, the press-molded product was taken out from the recovery container, and the press-molded product was treated in a nitric acid solution for at least 5 hours to remove copper, and then, the precipitate was washed with water and dried to obtain a powder. The obtained powder was identified by X-ray powder diffraction.

Figure 3:
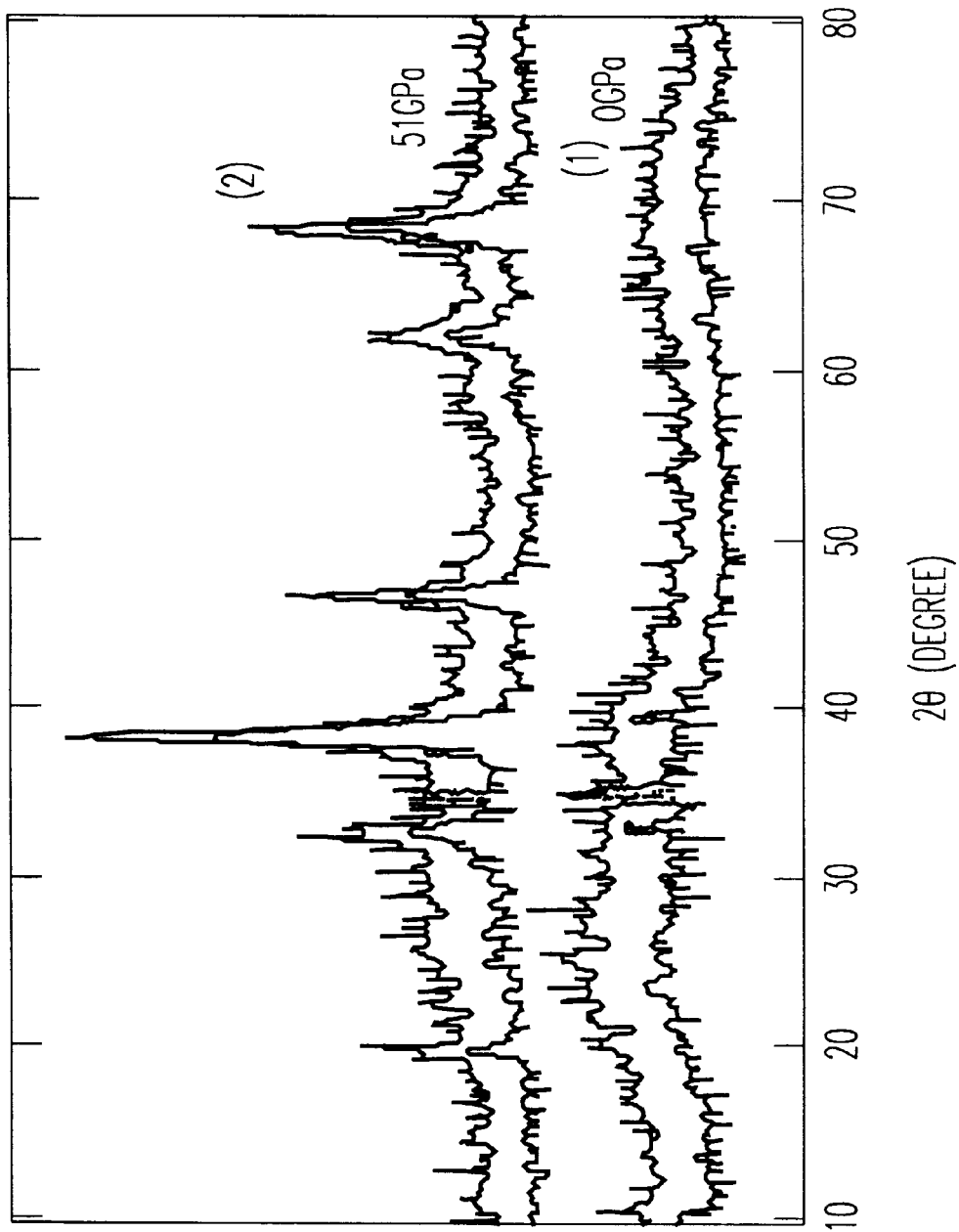
FIG. 3 is a graph showing the results of X-ray powder diffraction of the powder obtained in Example 2.

From the obtained diffraction spectrum as shown in FIG. 3, it was found to be substantially 100% cubic spinel type silicon oxynitride. (1) is the X-ray diffraction spectrum of the starting material amorphous silicon oxynitride (compositional formula: $Si_{3+x}O_{2x}N_4$, wherein x is 0.4), and (2) is the spectrum of the cubic spinel type silicon oxynitride obtained by the impulse treatment. Further, from the results of observation by an electron microscope, the particle size of the cubic spinel type silicon oxynitride prepared, was at a level of from 10 to 30 nm. From the electron energy loss spectrophotometry, the composition of the cubic spinel type silicon oxynitride was confirmed to be close to the compositional formula $Si_{3+x}O_{2x}N_4$ (x=0.4) of the starting material.

What is claimed is:

1. A high pressure phase spinel phase sialon represented by the chemical formula $Si_{6-x}Al_xO_xN_{8-x}$ (0<x<4.2).

2. A method for producing a spinel phase sialon powder, which comprises instantaneously pressing a press-molded product made of a mixture comprising a copper powder and a powder of a low pressure phase β-sialon represented by the chemical formula $Si_{6-x}Al_xO_xN_{8-x}$ (0<x<4.2), under a pressure of at least 15 GPa by an impulse wave for a pressing time of at most 5 microseconds, to let the low pressure phase β-sialon undergo phase transition to a high pressure phase spinel type sialon.

3. The high pressure phase spinel phase sialon of claim 1, wherein x is equal to 1.8.

4. The method of claim 2, wherein the low pressure phase β-sialon has a particle size of at most 10 μm.

5. The method of claim 2, wherein the low pressure phase β-sialon is prepared by reacting a powder mixture comprising $Si_3N_4$, $Al_2O_3$ and AlN in a predetermined ratio, at a temperature of from 1,700 to 1,800° C.

6. The method of claim 2, wherein the low pressure phase β-sialon is prepared by a high temperature spontaneous reaction in a nitrogen gas atmosphere in accordance with the following reaction formula:

$$3(6-Z)Si+ZAl+ZAl_2O_3+3(8-Z)/2N_2=3Si_{6-Z}Al_ZO_ZN_{8-Z}.$$

7. The method of claim 2, wherein the copper powder is an amount of from about 99 to 80 wt %.

8. The method of claim 2, wherein the copper powder has a particle size of at most 100 μm.

9. The method of claim 2, wherein the copper powder has a particle size of at most 50 μm.

10. The method of claim 2, wherein the copper powder has a particle size of at most 10 μm.

11. The method of claim 2, wherein said press-molding comprises using a pressing rod as a piston of a hydraulic pump in the container with the starting material.

12. The method of claim 2, wherein the apparent density of the press-molded product is from 50% to 80% of the theoretical density.

13. The method of claim 2, wherein the pressure during impulse pressing is at most 60 GPa.

14. The method of claim 2, wherein the pressure during impulse pressing is at most 50 GPa.

15. The method of claim 2, wherein the temperature during impulse pressing is at least 1,000° C. and at most 3,000° C.

* * * * *